United States Patent [19]

Quattrociocchi

[11] Patent Number: 5,595,472
[45] Date of Patent: Jan. 21, 1997

[54] ADJUSTABLE SEAL LUBRICATION HYDRAULIC POSITIONING DEVICE

[76] Inventor: Richard A. Quattrociocchi, 6208 Cemetary Rd., Rome, N.Y. 13440

[21] Appl. No.: 545,117

[22] Filed: Oct. 19, 1995

[51] Int. Cl.⁶ .................................................. F01D 11/00
[52] U.S. Cl. ........................................ 415/110; 415/113
[58] Field of Search ................................ 415/110, 111, 415/113, 170

[56] References Cited

U.S. PATENT DOCUMENTS

| | | | |
|---|---|---|---|
| 2,244,450 | 6/1941 | Erni | 415/113 |
| 2,738,996 | 3/1956 | Andersson | 415/112 |
| 4,183,714 | 1/1980 | Gosling | 415/112 |
| 4,673,332 | 6/1987 | Smith | 415/113 |
| 4,993,917 | 2/1991 | Kulle et al. | 415/112 |
| 5,193,974 | 3/1993 | Hufford | 415/111 |

Primary Examiner—John T. Kwon
Attorney, Agent, or Firm—Nims Howes Collins Hansen and Lackert

[57] ABSTRACT

A runner seal positioning system comprises an annular runner seal piston and an annular runner seal seated against the piston and mounted for rotation with respect to the piston. The runner seal and the piston allow a fluid leakage therebetween. A pressure supply extends to the piston for supplying a back pressure to force the piston against the runner seal to limit the fluid leakage. A weir box is provided, and a drain extends from the runner seal and the piston to the weir box for draining the fluid leakage into the weir box, so that the fluid level in the weir box is directly related to a rate of the fluid leakage. Pressure control componentry is operatively connected to the pressure supply and is responsive to the fluid level for automatically increasing the back pressure as the fluid level rises and automatically decreasing the back pressure as the fluid level falls.

20 Claims, 2 Drawing Sheets

FIG. I

ADJUSTABLE SEAL LUBRICATION HYDRAULIC POSITIONING DEVICE

BACKGROUND OF THE INVENTION

This invention relates to an adjustable seal lubrication hydraulic positioning device. More specifically, this invention relates to a runner seal positioning system particularly useful for a hydroelectric power generator turbine.

Hydroelectric power generation inherently involves exposing large, expensive machinery to water under high pressures. The possibility of water contamination poses a contstant threat to oil-lubricated parts of the machinery. One such part is the oil gallery of the turbine scroll case, which supports the upstream end of the turbine.

In a conventional hydroelectric turbine, such as the turbines at the Jarvis Hydroelectric Power Project in Hinckley, N.Y., the oil gallery is protected by a runner seal assembly and a labyrinth seal. Water first encounters the runner seal assembly and leaks into a runner seal cavity, where it drains through a runner seal cavity drain line. The runner seal assembly reduces the pressure of the water before the water encounters a labyrinth seal, which itself protects the oil gallery.

To lubricate and to provide cooling for the runner seal, it is necessary to allow some water leakage through the runner seal assembly. However, if too much water is allowed to leak into the runner seal cavity, the capacity of the runner seal cavity drain line will be exceeded and water pressure will build in the runner seal cavity, ultimately forcing water through the labyrinth seal and into the oil gallery and contaminating the lubrication oil.

Weighing these two considerations, it has been found at the turbines of the Jarvis Hydroelectric Power Project that an optimum rate of leakage past the runner seal assembly is from 5 to 10 gallons per minute. The leakage rate is influenced by such factors as the water level of the supply reservoir and the generation output of the turbines, both of which can vary. In particular, reservoir water levels are subject to rapid changes during the spring thaw.

Accordingly, the runner seal assembly must be able to accomodate changing conditions to keep the leakage rate in the optimum range. This is conventionally accomplished by utilizing a manually adjustable source of pressurized water to provide a back pressure to the runner seal. An increase in the back pressure tightens the runner seal assembly and reduces the leakage rate, while a decrease in the back pressure loosens the seal and allows a greater leakage rate. This adjustment process is called positioning the runner seal. The leakage rate is monitored continually, and maintenance personnel are called in to adjust the back pressure as needed.

This system of adjusting the leakage rate has proven to be wasteful in both time and expense. The need for adjusting piston back pressure causes frequent, irregular, and unwelcome interruptions in the schedules of maintenance workers. Moreover, in the time that passes between the onset of a non-optimal leakage rate and the correction of the leakage rate, the turbine undergoes excessive wear. Periods of a low leakage rate cause premature wear of the runner seal assembly, and periods of high leakage rate introduce water to the oil gallery.

OBJECTS OF THE INVENTION

It is an object of the invention to provide a runner seal positioning system.

It is a further object of the present invention to provide a runner seal positioning method.

An additional object of the present invention is to provide such a system which operates with little manual oversight.

A further object of the present invention is to provide such a system which reduces turbine maintenance.

Yet another object of the present invention is to provide such a system that is inexpensive and simple to install on existing hydroelectric turbine generators.

These and other objects of the present invention will be apparent from the drawings and detailed descriptions herein.

SUMMARY OF THE INVENTION

A runner seal positioning system according to the present invention comprises an annular runner seal piston and an annular runner sea seated against the piston and mounted for rotation with respect to the piston. The runner seal and the piston allow a fluid leakage therebetween. A pressure supply extends to the piston for supplying a back pressure to force the piston against the runner seal to limit the fluid leakage. A drain extends from the runner seal and the piston to a weir box for channeling the leakage fluid into the weir box. The fluid level in the weir box is directly related to a rate of the fluid leakage. Pressure control componentry is operatively connected to the pressure supply and is responsive to the fluid level in the weir box for increasing the back pressure on the piston as the fluid level rises and decreasing the back pressure as the fluid level falls.

According to a particular embodiment of the present invention, the weir box is provided with a weir having a V-shaped aperture. The weir divides the weir box into an upstream compartment and a downstream compartment. The runner seal drain extends to the upstream compartment. The fluid level in the weir box is the fluid level in the upstream compartment. The weir box may be provided with baffles for reducing turbulence.

The runner seal positioning system defined above may further comprise a frame and a rotor. The piston is mounted to the frame for sliding motion alternately toward and away from the runner seal. The rotor is disposed for rotation with respect to the frame, with the runner seal being mounted to the rotor. The piston, the runner seal, the frame, and the rotor define a runner seal cavity. The drain comprises a runner seal cavity drain line extending from the runner seal cavity to the weir box.

The frame can be positioned inside a penstock of a hydroelectric power generator. In this case, the rotor is provided with a turbine.

According to another particular embodiment of the present invention, where the piston is mounted to a frame for sliding motion alternately toward and away from the runner seal, the frame and the piston define an operating chamber on a side of the piston opposite the runner seal. The pressure supply includes a pressurized fluid supply extending to the operating chamber. In this embodiment, the pressure control componentry may include a bleed line communicating with the pressurized fluid supply and may further include a float valve connected in series with the bleed line and operatively associated with the weir box so that the float valve opens as a fluid level in the weir box falls, and so that the float valve closes as the fluid level rises.

According to another conceptualization of the present invention, a runner seal positioning system comprises an annular runner seal piston and an annular runner seal seated against the piston and mounted for rotation with respect to the piston. The runner seal and the piston allow a fluid leakage therebetween. A pressurized fluid supply extends to the piston for supplying a back pressure to force the piston against the runner seal to limit the fluid leakage. A weir box is provided, and a drain extends from the runner seal and the piston to the weir box for draining the fluid leakage into the weir box. A fluid level in the weir box is directly related to a rate of the fluid leakage. A bleed line communicates with the pressurized fluid supply extending to the piston. A float valve connected in series with the bleed line is operatively associated with the weir box so that the float valve opens as a fluid level in the weir box falls, thereby reducing back pressure to increase the fluid leakage, and so that the float valve closes as the fluid level rises, thereby increasing the back pressure to decrease the fluid leakage.

In this conceptualization of the invention, the float valve may comprise a frame or support and a valve element mounted to the support at an adjustable height. The valve element is connected in series to, or disposed in, the bleed line. A valve arm having a first and a second end is operatively connected at the first end thereof to the valve element so that the valve element opens as the valve arm is lowered and so that the valve element closes as the valve arm is raised. A float is mounted to the second end of the valve arm and is positioned inside the weir box so that the float substantially follows the level of fluid inside the weir box.

The weir box may be provided with a weir having a V-shaped aperture. The weir then divides the weir box into an upstream compartment and a downstream compartment. The drain extends to the upstream compartment of the weir box. The fluid level in the upstream compartment is automatically monitored by the float valve. The weir box may further be provided with baffles, particularly in the upstream compartment of the box, for reducing fluid turbulence.

As discussed above, the runner seal may be mounted to a rotor, while the piston is mounted to a frame for sliding motion alternately toward and away from the runner seal. In that event, the piston, the runner seal, the frame, and the rotor define a runner seal cavity from which the drain extends.

As further discussed above, where the piston is mounted to a frame for sliding motion toward and away from the runner seal, the frame and the piston define an operating chamber on a side of the piston opposite the runner seal. The pressurized fluid supply then extends to the operating chamber.

A method, in accordance with the present invention, of regulating leakage of a fluid between an annular runner seal piston and an annular runner seal seated against the piston and mounted for rotation with respect to the piston comprises the steps of: (1) supplying a back pressure to a side of the piston opposite the runner seal; (2) draining leakage from between the runner seal and the piston to a weir box; (3) automatically monitoring a level of fluid in the weir box; and (4) in response to the step of monitoring, automatically controlling the back pressure to reduce the back pressure as the level of fluid falls below a predetermined level and to increase the back pressure as the level of fluid rises above the predetermined level.

Supplying back pressure to the piston may include the step of supplying pressurized fluid to an operating chamber on the side of the piston opposite the runner seal.

The automatic monitoring of the fluid level may comprise the step of moving a float to follow the level of fluid, the float being connected to a float valve. The automatic control of the piston back pressure then includes automatically operating the float valve in response to motion of the float so that the float valve closes as the level of fluid rises and so that the float valve opens as the level of fluid falls.

The automatic control of the piston back pressure may include the step, performed as the level of fluid falls, of bleeding off the back pressure via a bleed line connected in series with the float valve and communicating with the operating chamber. The automatic control may also include the step, performed as the level of fluid rises, of increasing the back pressure via the bleed line.

A runner seal positioning system in accordance with the present invention is reliable, substantially reduces hydroelectric turbine maintenance costs, and is simple to build and install on existing hydroelectric turbine generators.

DETAILED DESCRIPTION OF THE INVENTION

Figure 1:
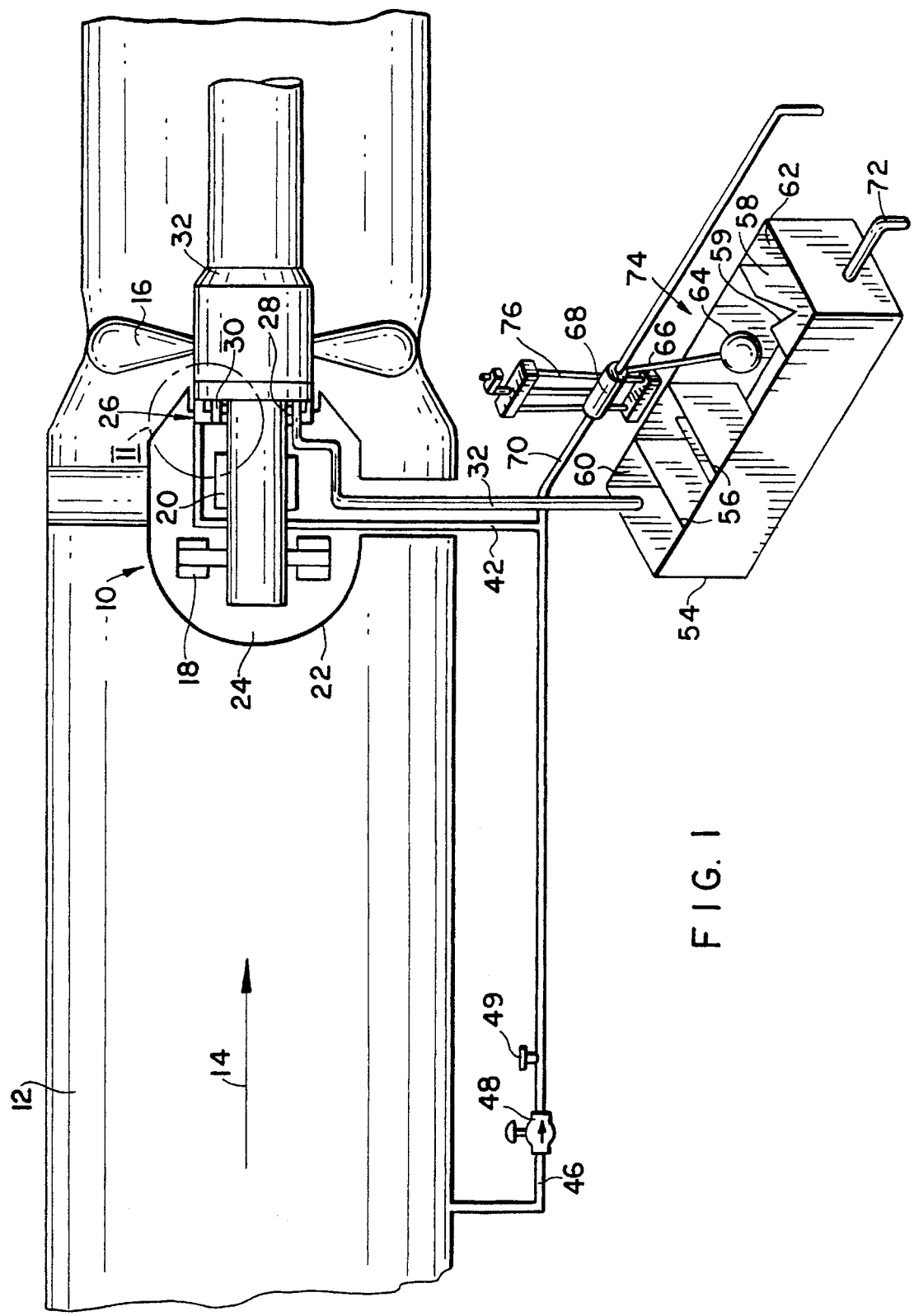
FIG. 1 is a schematic view of a runner seal positioning system in accordance with the present invention.

As illustrated in FIG. 1, in a hydroelectric turbine generator 10, such as the tube type Kaplan turbine packages at the Jarvis Hydroelectric Power Project in Hinckley, N.Y., water from a reservoir flows through a penstock 12 in a direction indicated by arrow 14. Runner blades 16 of turbine 10 are mounted to a rotor 32 rotatably supported at the upstream end by a thrust bearing 18 and a guide bearing 20 mounted inside an oil gallery 24 of a turbine scroll case 22.

To prevent contamination of the oil gallery with water from penstock 12, the oil gallery is protected by a runner seal assembly 26 and a labyrinth seal 28. Water first encounters runner seal assembly 26 and leaks into a runner seal cavity 30, where it drains through a runner seal cavity drain line 32. Runner seal assembly 26 reduces the pressure of the water before the water encounters labyrinth seal 28, which itself protects oil gallery 24.

To lubricate and to provide cooling for the runner seal, it is necessary to allow some water leakage through runner seal assembly 26. However, if too much water is allowed to leak into runner seal cavity 30, the capacity of runner seal cavity drain line 32 will be exceeded and water pressure will build therein, ultimately forcing water through labyrinth seal 28 and into oil gallery 24. At the turbines of the Jarvis Hydroelectric Power Project, an optimum rate of leakage past the runner seal assembly is from 5 to 10 gallons per minute.

Figure 2:
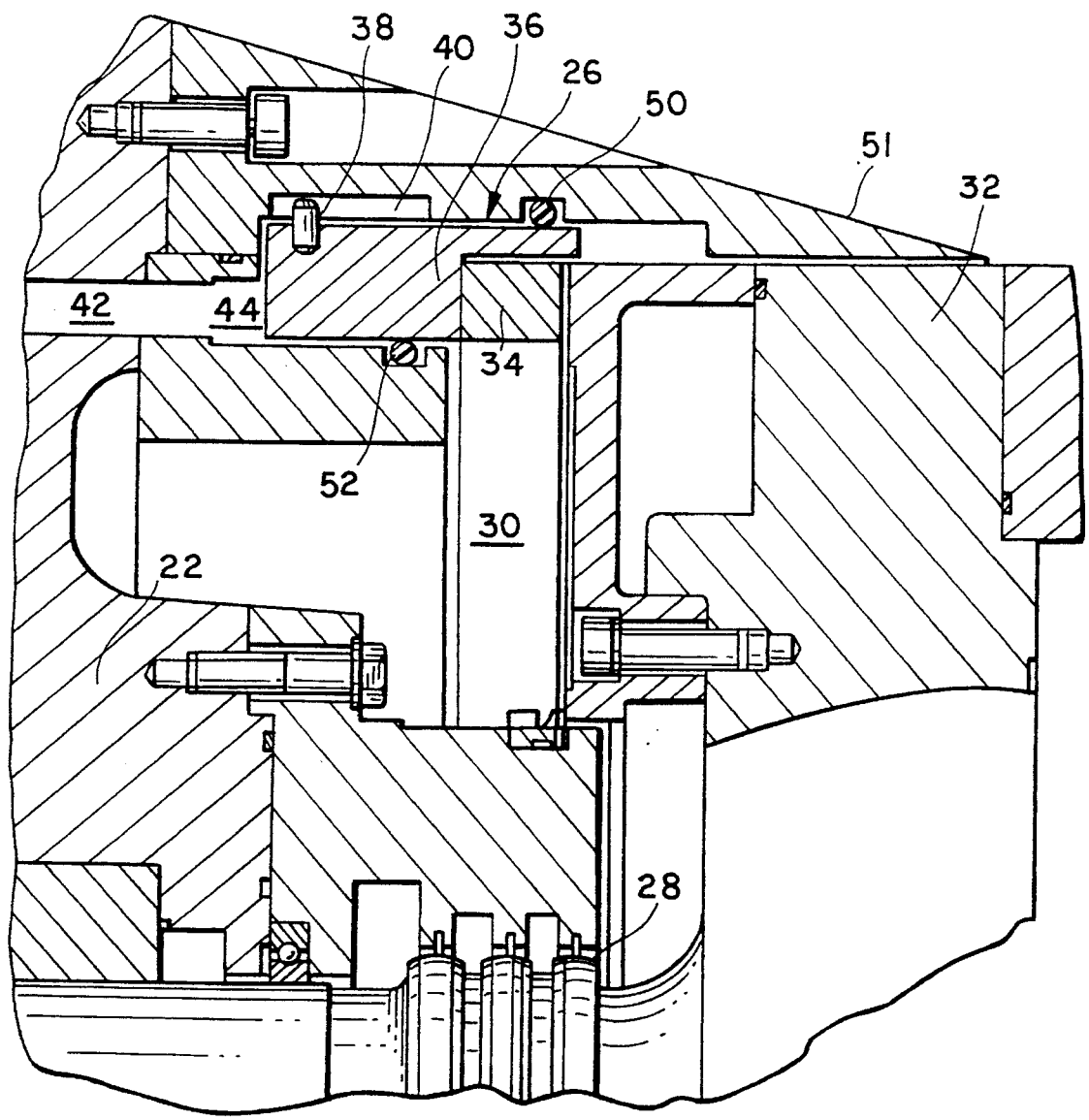
FIG. 2 is an enlarged partial cross-sectional view of area II in FIG. 1.

As depicted in FIG. 2, runner seal assembly 26 includes an annular runner seal 34 mounted to rotor 32 for rotation therewith, and an annular runner seal piston 36 mounted to scroll case 22. An anti-rotating pin 38 embedded in runner seal piston 36 projects into an axially oriented slot or keyway 40 in scroll case 22 to prevent rotation of runner seal piston 36 with respect to the scroll case. Slot 40 and pin 38 permit axial movement of runner seal piston 36 alternately toward and away from runner seal 34. A runner seal pressure line 42 extends to an operating chamber 44 defined by scroll case 22 and runner seal piston 36. Runner seal pressure line 42 is supplied with pressurized fluid by a pressurized fluid source such as a pipe 46 (FIG. 1) connected to penstock 12 upstream of turbine 10 and regulated by a pressure reducing valve 48 and an orifice 49.

Relatively high pressures in operating chamber 44 force runner seal piston 36 tightly against runner seal 34, thus limiting the leakage of water through runner seal assembly 26 into runner seal cavity 30. Water enters the runner seal chamber through the clearance between rotating shaft 32 and a runner seal flange 51. Lower pressures in operating chamber 44 hold runner seal piston 36 less tightly, thereby allowing greater leakage of water through runner seal assembly 26. Sealing rings 50 and 52 prevent the leakage of pressurized fluid into and out of operating chamber 44 (other than through pressure line 42) while permitting axial motions of runner seal piston 36.

As shown in FIG. 1, water leaking into runner seal cavity 30 is drained via runner seal drain line 32 into an upstream compartment 60 of a weir box 54. Upstream compartment 60 of weir box 54 is provided with baffles 56 to reduce turbulence. Weir box 54 is further provided with a weir 58 which has a V-shaped aperture or slot 59 therein and which divides the weir box into upstream compartment 60 and a downstream compartment 62. Water drains from downstream compartment 62 via drain pipe 72. Weir 58 limits the rate at which water can flow from upstream compartment 60 to downstream compartment 62 through aperture 59. Accordingly, when the rate of water flowing into upstream compartment 60 from runner seal drain line 32 is relatively high, the water level in upstream compartment 60 will be relatively high. Conversely, when the rate of water flowing into upstream compartment 60 from runner seal drain line 32 is relatively low, the water level in upstream compartment 60 will be relatively low. Since the rate of water flowing into weir box 54 from drain line 32 is the same as the rate of water leakage through runner seal assembly 26, the water level in upstream compartment 60 will be high when the leakage rate is high, and low when the leakage rate is low.

A float valve assembly 74 includes a float 64 positioned in weir box 54 to follow the level of the water in upstream compartment 60. Float 64 is connected via an arm 66 to a valve element 68. Float valve assembly 74 is oriented such that as the water level in weir box 54 rises, valve element 68 closes, and as float 64 falls, valve element 68 opens.

Float valve element 68 is connected in series to a bleed line 70, which is connected to runner seal pressure line 42. Accordingly, as valve element 68 opens, pressurized fluid is allowed to flow out of pressure line 42 and through bleed line 70, thus reducing the pressure in operating chamber 44. As valve element 68 closes, the flow of fluid through bleed line 70 is reduced, thus increasing the pressure in operating chamber 44.

As discussed above, higher pressure in operating chamber 44 reduces water leakage past runner seal assembly 26 while lower pressure in chamber 44 increases water leakage past runner seal assembly 26. Thus, a high leakage rate closes valve element 68 to increase pressure in chamber 44 to reduce leakage, and a low leakage rate opens valve element 68 to reduce pressure in chamber 44 to increase leakage. In this way, an optimal leakage rate is maintained automatically. Sensitivity to changes in leakage rate is increased by orifice 49.

Float valve assembly 74 is supported by an adjustably positioned linear bar guide 76 which enables a modification of the height of float valve assembly 74 with respect to weir box 54. A positional adjustment of linear bar guide 76 results in a setting or resetting of an optimal water level in weir box 54, and thus of an optimal leakage rate.

Although the invention has been described in terms of particular embodiments and applications, one of ordinary skill in the art, in light of this teaching, can generate additional embodiments and modifications without departing from the spirit of or exceeding the scope of the claimed invention, Accordingly, it is to be understood that the drawings and descriptions herein are profferred by way of example to facilitate comprehension of the invention and should not be construed to limit the scope therof.

I claim:

1. A runner seal positioning system comprising:

an annular runner seal piston;

an annular runner seal seated against said piston and mounted for rotation with respect to said piston, said runner seal and said piston allowing a fluid leakage therebetween;

pressure supply means extending to said piston for supplying a back pressure to force said piston against said runner seal to limit the fluid leakage;

a weir box;

drain means extending from said runner seal and said piston to said weir box for draining the fluid leakage into said weir box, a fluid level in said weir box being directly related to a rate of the fluid leakage; and pressure control means operatively connected to said pressure supply means and responsive to said fluid level for increasing said back pressure as said fluid level rises and decreasing said back pressure as said fluid level falls.

2. The system defined in claim 1 wherein said weir box is provided with a weir having a V-shaped aperture, said weir dividing said weir box into an upstream compartment and a downstream compartment, said drain means extending to said upstream compartment, said fluid level in said weir box being the fluid level in said upstream compartment.

3. The system defined in claim 1 wherein said weir box is provided with baffles for reducing turbulence.

4. The system defined in claim 1, further comprising a frame and a rotor, said piston being mounted to said frame for sliding motion alternately toward and away from said runner seal, said rotor being mounted for rotation with respect to said frame, said runner seal being mounted to said rotor.

5. The system defined in claim 4 wherein said piston, said runner seal, said frame, and said rotor define a runner seal cavity, said drain means comprising a runner seal cavity drain line extending from said runner seal cavity to said weir box.

6. The system defined in claim 4 wherein said frame is mounted inside a penstock of a hydroelectric power generator and said rotor is provided with a turbine.

7. The system defined in claim 1 further comprising a frame, said piston being mounted to said frame for sliding motion alternately toward and away from said runner seal, said frame and said piston defining an operating chamber on a side of the piston opposite said runner seal, said pressure supply means including a pressurized fluid supply extending to said operating chamber.

8. The system defined in claim 7 wherein said pressure control means comprises:

a bleed line communicating with said pressurized fluid supply; and a float valve connected in series with said bleed line and operatively associated with said weir box so that said float valve opens as a fluid level in said weir box falls and so that said float valve closes as said fluid level rises.

9. A runner seal positioning system comprising:

an annular runner seal piston;

an annular runner seal seated against said piston and mounted for rotation with respect to said piston, said runner seal and said piston allowing a fluid leakage therebetween;

pressurized fluid supply means extending to said piston for supplying a back pressure to force said piston against said runner seal to limit the fluid leakage;

a weir box;

drain means extending from said runner seal and said piston to said weir box for draining the fluid leakage into said weir box, a fluid level in said weir box being directly related to a rate of the fluid leakage;

a bleed line communicating with said pressurized fluid supply means;

a float valve connected in series with said bleed line and operatively associated with said weir box so that said float valve opens as a fluid level in said weir box falls, thereby reducing back pressure to increase the fluid leakage, and so that said float valve closes as said fluid level rises, thereby increasing the back pressure to decrease the fluid leakage.

10. The system defined in claim 9 wherein said float valve comprises:

a frame;

a valve element mounted to said frame at an adjustable height, said valve element being connected in series to said bleed line;

a valve arm having a first and a second end, said valve arm being operatively connected at the first end thereof to said valve element so that said valve element opens as said valve arm is lowered and so that said valve element closes as said valve arm is raised; and a float mounted to the second end of the valve arm and positioned inside said weir box so that said float substantially follows the level of fluid inside the weir box.

11. The system defined in claim 9 wherein said weir box is provided with a weir having a V-shaped aperture, said weir dividing said weir box into an upstream compartment and a downstream compartment, said drain means extending to said upstream compartment, said fluid level in said weir box being the fluid level in said upstream compartment.

12. The system defined in claim 9 wherein said weir box is provided with baffles for reducing turbulence in the fluid in the weir box.

13. The system defined in claim 9 further comprising a frame and a rotor mounted for rotation with respect to said frame, said piston being mounted to said frame for sliding motion alternately toward and away from said runner seal, said runner seal being mounted to said rotor.

14. The system defined in claim 13 wherein said piston, said runner seal, said frame, and said rotor define a runner seal cavity, said drain means comprising a runner seal cavity drain line extending from said runner seal cavity to said weir box.

15. The system defined in claim 9 further comprising a frame, said piston being mounted to said frame for sliding motion toward and away from said runner seal, said frame and said piston defining an operating chamber on a side of the piston opposite said runner seal, said pressurized fluid supply means extending to said operating chamber.

16. The system defined in claim 15 wherein said frame is mounted inside a penstock of a hydroelectric power generator and said rotor is provided with a turbine.

17. A method of regulating leakage of a fluid between an annular runner seal piston and an annular runner seal seated against said piston and mounted for rotation with respect to said piston, said method comprising the steps of:

supplying a back pressure to a side of said piston opposite said runner seal;

draining leakage from between said runner seal and said piston to a weir box;

automatically monitoring a level of fluid in said weir box; and in response to said step of monitoring, automatically controlling said back pressure to reduce said back pressure as said level of fluid falls below a predetermined level and to increase said back pressure as said level of fluid rises above the predetermined level.

18. The method defined in claim 17 wherein the step of supplying back pressure comprises the step of supplying pressurized fluid to an operating chamber on the side of said piston opposite the runner seal.

19. The method defined in claim 18 wherein the step of automatically monitoring said level of fluid comprises the step of moving a float to follow said level of fluid, said float being connected to a float valve, said step of automatically controlling including automatically operating said float valve in response to motion of said float so that said float valve closes as said level of fluid rises and so that said float valve opens as said level of fluid falls.

20. The method defined in claim 19 wherein the step of automatically controlling includes the step, performed as said level of fluid falls, of bleeding off said back pressure via a bleed line connected in series with said float valve and communicating with said operating chamber, the step of automatically controlling also including the step, performed as said level of fluid rises, of increasing said back pressure via said bleed line.

\* \* \* \* \*